(No Model.)
C. V. W. WHALER.
UMBRELLA SUPPORT.
No. 467,761. Patented Jan. 26, 1892.
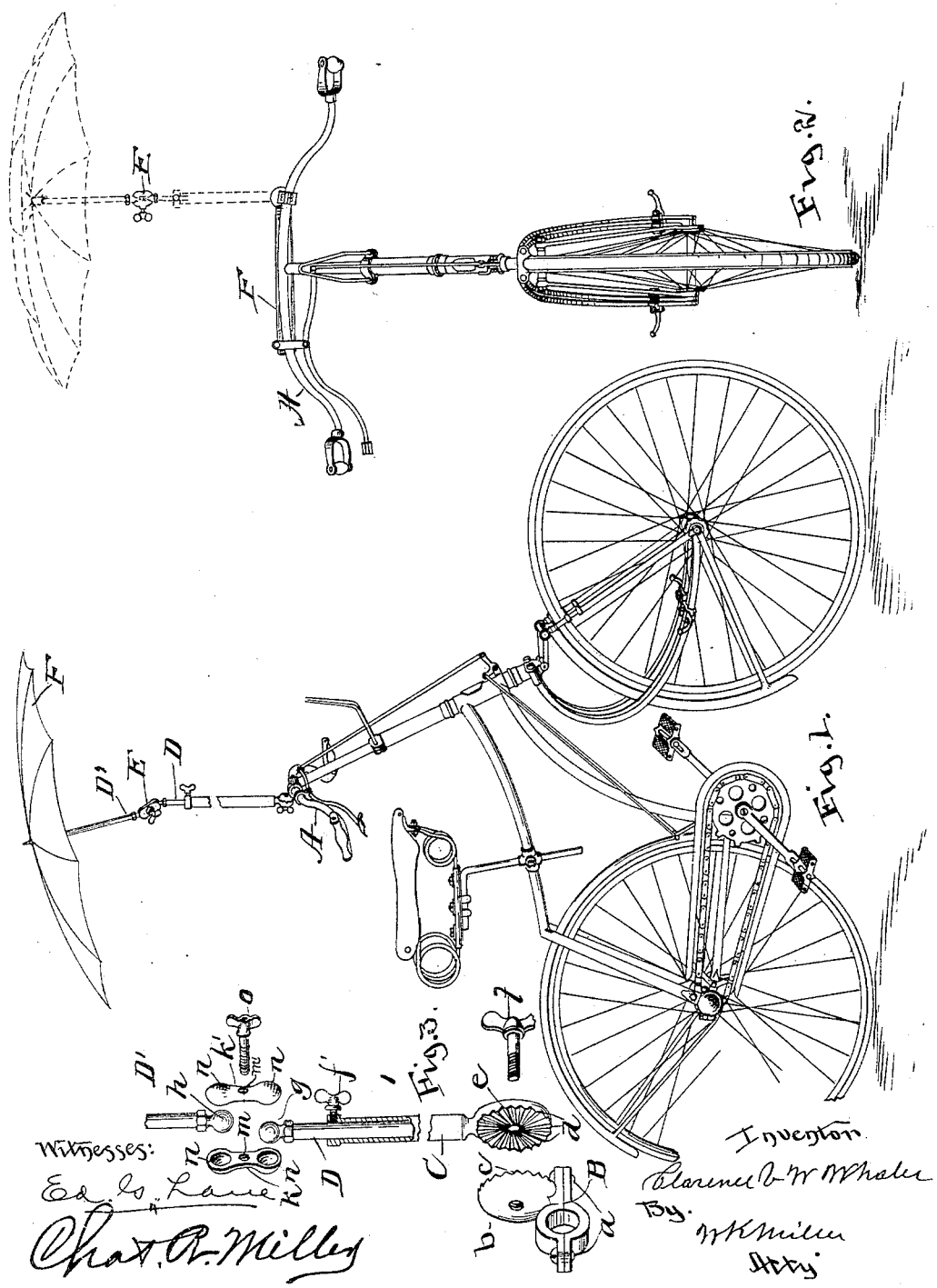

UNITED STATES PATENT OFFICE.

CLARENCE V. W. WHALER, OF TOLEDO, OHIO.

UMBRELLA-SUPPORT.

SPECIFICATION forming part of Letters Patent No. 467,761, dated January 26, 1892.

Application filed October 5, 1891. Serial No. 407,751. (No model.)

*To all whom it may concern:*

Be it known that I, CLARENCE V. W. WHALER, a citizen of the United States, and a resident of Toledo, county of Lucas, State of Ohio, have invented a new and useful Improvement in Umbrella-Supports, of which the following is a full, clear, and exact description, reference being had to the accompanying drawings, making part of this specification.

My invention relates to an improvement in umbrella-supports, and more particularly to a support adapted for use on bicycles, the object of which is to provide an umbrella holder or support that may be secured to the handle-bar of a bicycle to support and carry an umbrella at any desired height or angle or inclination to protect the rider from the heat of the sun or from the falling rain, that may, when not in use as a shade or shield, be folded down across the bicycle by the side of and parallel with the handle-bar.

With these ends in view my invention consists in certain features of construction and combination of parts, as will be hereinafter described, and pointed out in the claims.

Figure 1 of the accompanying drawings is a side elevation of a bicycle, illustrating my invention in use. Fig. 2 is a front elevation of a bicycle, illustrating the umbrella and support folded at the front side of the handle-bar, and shown in vertical position by the dotted lines; and Fig. 3 is a perspective comprising all of the parts in detail.

Similar letters of reference indicate corresponding parts in all of the figures of the drawings.

As my invention is applicable to any of the well-known bicycles, I will proceed with the description thereof, referring to the bicycle only as conjunctional thereto, A representing the handle-bar, to which the clip B is secured by the bolts $a$, said clip having a disk $b$, provided with radial teeth $c$ on the face thereof to correspond with teeth $d$ on disk $e$ at the lower end of socket or staff portion C. In the disk $c$ is provided a central perforation and in the disk $e$ an unthreaded perforation, through which the thumb-screw $f$ is passed and turned into the thread in the perforation in the disk $c$. The disk $e$ may rotate about the screw $f$, which serves to secure the staff C in desired adjustment. In the cylinder portion of the staff C is placed a stem portion D, adapted for adjustment in said cylinder or socket, by which the height of the umbrella may be adjusted and be secured in desired adjustment by the thumb-screw $f$. At the upper end of the stem D is provided a ball or spherical portion $g$. The lower end of the umbrella-handle D' is also provided with a ball or spherical portion $h$. To form a double ball-and-socket joint E, as shown in Figs. 1 and 2, counterpart clamps $k$ $k'$ are provided, having central perforations $m$ $m'$, the former having a screw-thread and at each end semi-spherical sockets $n$, that embrace the balls $g$ and $h$. The thumb-screw $o$ is passed through the perforation $m'$ and turned into the threaded perforation $m$ to secure the parts in desired adjustment.

In operation the bottom or staff portion C is secured in vertical adjustment by the toothed disks $b$ and $e$ and screws $f$, or it may be adjusted at any desired angle in one plane. The stem D is raised and secured in desired adjustment by the screw $f'$. The double ball-and-socket joints formed by the balls $g$ and $h$ and clamps $k$ $k'$, having sockets to embrace the balls $n$, serve to adjust the umbrella-handle D' and umbrella at any desired angle or to offset the handle to one side of the stem D, in either of which adjustments the parts may be secured by the thumb-screw $o$, and when not in use the umbrella is let down, the stem D slid down into the staff C, the thumb-screw $o$ turned back slightly to release the grasp of the sockets $n$ on the balls $g$ and $h$, when the folded umbrella may be folded down by the side of staff C. The thumb-screw $f$ is then turned back to allow the teeth on the disks $b$ and $e$ to become disengaged, when the staff with the folded umbrella is folded or turned down by the side of the handle-bar, as shown in Fig. 2, the screws $f$ and $o$ turned in to hold the parts in folded position.

Having thus fully described the nature and object of my invention, what I claim, and desire to secure by Letters Patent, is—

1. In an umbrella-support for bicycles, clamp B, to embrace the handle-bar, said clamp having a toothed disk $b$, a hollow staff or body portion C, having at its bottom portion a toothed disk $e$ to engage the teeth of the disk $b$, a thumb-screw $f$ to secure the disks in desired adjustment, a stem D to slide in the staff, said stem having at its outer end a ball $g$, an umbrella-handle D', having at its lower end a ball $h$, and clamps $k\ k'$, having at each end thereof semicircular sockets $n$ to grasp the balls to form a double ball-and-socket joint E, and thumb-screw $o$, whereby the umbrella may be carried at any desired height or angle or be folded down by the side of the handle-bar, substantially as described, and for the purpose set forth.

2. In an umbrella-support for bicycles, a clamp adapted to be secured to a handle-bar of a bicycle, a tube, means for securing said tube to the clamp in a vertical, horizontal, or inclined position, a stem secured to said tube and provided with a ball-head, an umbrella-handle provided with a ball-head, clamp-plates having at each end a semi-spherical socket, and a screw for drawing the clamp-plates together against said ball-heads.

In testimony whereof I have hereunto set my hand this 23d day of September, A. D. 1891.

CLARENCE V. W. WHALER.

Witnesses:
W. K. MILLER,
CHAS. R. MILLER.